(12) United States Patent
Tang

(10) Patent No.: US 11,240,791 B2
(45) Date of Patent: Feb. 1, 2022

(54) COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: SHENZHEN HEYTAP TECHNOLOGY CORP., LTD., Guangdong (CN)

( * ) Notice: Subject to any disclaimer, the term of this patent is extended or adjusted under 35 U.S.C. 154(b) by 0 days.

(21) Appl. No.: 16/492,872

(22) PCT Filed: Mar. 15, 2017

(86) PCT No.: PCT/CN2017/076857
§ 371 (c)(1),
(2) Date: Sep. 11, 2019

(87) PCT Pub. No.: WO2018/165928
PCT Pub. Date: Sep. 20, 2018

(65) Prior Publication Data
US 2020/0015204 A1 Jan. 9, 2020

(51) Int. Cl.
*H04W 72/04* (2009.01)
(52) U.S. Cl.
CPC ..... *H04W 72/042* (2013.01); *H04W 72/0446* (2013.01)
(58) Field of Classification Search
None
See application file for complete search history.

(56) References Cited

U.S. PATENT DOCUMENTS

| | | | |
|---|---|---|---|
| 9,072,051 B2 | 6/2015 | Chun et al. | |
| 2013/0114572 A1* | 5/2013 | Fong | H04L 1/0038 370/336 |
| 2015/0078307 A1* | 3/2015 | Ohta | H04W 76/27 370/329 |
| 2016/0380742 A1 | 12/2016 | Suzuki et al. | |
| 2017/0171839 A1* | 6/2017 | Larijani | H04W 74/006 |
| 2017/0325204 A1 | 11/2017 | Zhu et al. | |

(Continued)

FOREIGN PATENT DOCUMENTS

| | | |
|---|---|---|
| CN | 101605356 A | 12/2009 |
| CN | 102487547 A | 6/2012 |
| EP | 2640141 A1 | 9/2013 |

(Continued)

OTHER PUBLICATIONS

International Search Report in the international application No. PCT/CN2017/076857, dated Jul. 3, 2017.

(Continued)

*Primary Examiner* — Lonnie V Sweet
(74) *Attorney, Agent, or Firm* — Ladas & Parry, LLP

(57) ABSTRACT

The embodiments of the present application provide a communication method, a terminal device and a network device, which can improve flexibility of the terminal device in monitoring downlink control information. The method includes that: a terminal device determines a target monitoring resource configured to monitor downlink control information; and the downlink control information is monitored on the target monitoring resource.

16 Claims, 6 Drawing Sheets

(56) References Cited

U.S. PATENT DOCUMENTS

2018/0310281 A1* 10/2018 Takeda ................. H04L 1/1893
2020/0162212 A1* 5/2020 Liu ................... H04W 72/0453

FOREIGN PATENT DOCUMENTS

| JP | 2020503808 A | 1/2020 |
|----|--------------|--------|
| RU | 2593385 C1 | 8/2016 |
| WO | 2012072027 A1 | 6/2012 |
| WO | 2016119112 A1 | 8/2016 |
| WO | 2017026973 A1 | 2/2017 |
| WO | 2018126401 A1 | 7/2018 |

OTHER PUBLICATIONS

Written Opinion of the International Search Authority in the international application No. PCT/CN2017/076857, dated Jul. 3, 2017 and English translation provided by Google translate.

LG Electronics Inc. "Numerology impact on DRX", 3GPP TSG-RAN WG2 Meeting #97 R2-1701540 Athens, Greece, Feb. 13-17, 2017.

First Office Action of the Russian application No. 2019132408, dated Jun. 25, 2020.

Supplementary European Search Report in the European application No. 17900823.0, dated Feb. 17, 2020.

English translation of the Written Opinion of the International Search Authority in the international application No. PCT/CN2017/076857, dated Jul. 3, 2017.

First Office Action of the Canadian application No. 3056005, dated Nov. 3, 2020.

Written Opinion of the Singaporean application No. 11201908499Y, dated Oct. 27, 2020.

Office Action of the Indian application No. 201917040850, dated Jan. 28, 2021.

Ericsson, Impact on MAC from PDCCH monitoring occasions [online], 3GPP TSG RAN WG2 #97 R2-1700846, Internet<URL: http://www.3gpp.org/ftp/tsg_ran/WG2_RL2/TSGR2_97/Docs/R2-1700846.zip>.

NTT DOCOMO, Inc., s(E)PDCCH for shortened TTI [online], 3GPP TSG-RAN WG1 #86b R1-1610045, Internet<URL: http://www.3gpp.org/ftp/tsg_ran/WG1_RL1/TSGR1_86b/Docs/R1-1610045.zip>.

Qualcomm Incorporated, On collision between an EPDCCH decoding candidate and PSS/SSS/PBCH [online], 3GPP TSG-RAN WG1 #73 R1-132477, Internet<URL: http://www.3gpp.org/ftp/tsg_ran/WG1_RL1/TSGR1_73/Docs/R1-132477.zip>.

First Office Action of the Japanese application No. 2019-549580, dated Mar. 5, 2021.

First Office Action of the Taiwanese application No. 107106892, dated May 19, 2021.

Notice of Review of the Taiwanese application No. 107106892, dated Apr. 25, 2021.

First Office Action of the European application No. 17900823.0, dated Oct. 7, 2021.

* cited by examiner

COMMUNICATION METHOD, TERMINAL DEVICE AND NETWORK DEVICE

CROSS-REFERENCE TO RELATED APPLICATION

The present application is the U.S. national phase application of PCT Application No. PCT/CN2017/076857 filed on Mar. 15, 2017, the disclosure of which is incorporated herein in its entirety by reference.

TECHNICAL FIELD

The application relates to the field of communication, and more particularly to a communication method, a terminal device and a network device.

BACKGROUND

In a New Radio (NR) system, a physical layer may support a basic parameter set. A subframe corresponding to a basic parameter set includes a certain number of slots, and a terminal device may monitor downlink control information at the certain number of slots. However, a specific slot at which downlink control information is monitored is configured for a terminal device by a network device, so that flexibility of the terminal device in monitoring downlink control information is poor.

Therefore, a method is needed to improve flexibility of a terminal device in monitoring downlink control information.

SUMMARY

The Technical Problem

Embodiments of the application provide a communication method, a terminal device and a network device, which can improve flexibility of the terminal device in monitoring downlink control information.

Solution to the Problem

Technical Solution

A first aspect provides a communication method, which may include that a terminal device determines a target monitoring resource configured to monitor downlink control information; and the downlink control information is monitored on the target monitoring resource.

Optionally, a network device may pre-configure a group of monitoring resources for the terminal device, the group of monitoring resources may include at least one monitoring resource, and each monitoring resource in the at least one monitoring resource may include a periodic time-domain resource. The terminal device may select the target monitoring resource configured to monitor the downlink control information from the at least one monitoring resource. Optionally, the terminal device may regulate a first monitoring resource in the at least one monitoring resource, for example, regulating a monitoring period of the first monitoring resource or the number of monitoring positions in each monitoring period, and determine the regulated first monitoring resource as the target monitoring resource.

Optionally, if the at least one monitoring resource pre-configured by the network device includes only one monitoring resource, that is, the network device configures only one monitoring resource for the terminal device, and if the terminal device monitors the downlink control information based on the monitoring resource, flexibility is poor. Therefore, the terminal device may regulate the monitoring resource based on the demand for opportunities for monitoring the downlink control information, for example, regulating a monitoring period or monitoring positions in each monitoring period, and determine the regulated monitoring resource as the target monitoring resource. For example, if the terminal device determines that the monitoring opportunities are required to be increased, the terminal device may shorten the monitoring period or increase the number of the monitoring positions in each monitoring period; or if the terminal device determines that the monitoring opportunities are required to be decreased, the terminal device may prolong the monitoring period or decrease the number of the monitoring positions in each monitoring period.

According to the communication method of the embodiments of the application, the terminal device itself may determine a target monitoring resource configured to monitor downlink control information, so that the flexibility in monitoring the downlink control information is improved. Optionally, the terminal device may determine the target monitoring resource in the multiple pre-configured monitoring resources based on the demands for the opportunities for monitoring the downlink control information, or may regulate the pre-configured monitoring resource based on the demand for the downlink monitoring resource and determine the regulated monitoring resource as the target monitoring resource, so that the flexibility of the terminal device in monitoring downlink control information is improved.

In combination with the first aspect, in some implementation modes of the first aspect, the target monitoring resource may include a periodic monitoring position.

In combination with the first aspect, in some implementation modes of the first aspect, the method may further include that: the terminal device receives information of a group of monitoring resources from a network device; and the operation that the terminal device determines the target monitoring resource configured to monitor the downlink control information may include that: the target monitoring resource is determined based on the group of monitoring resources.

In combination with the first aspect, in some implementation modes of the first aspect, the operation that the target monitoring resource is determined based on the group of monitoring resources may include that: the target monitoring resource is determined based on the group of monitoring resources and reception of the downlink control information.

In combination with the first aspect, in some implementation modes of the first aspect, the operation that the target monitoring resource is determined based on the group of monitoring resources and the reception of the downlink control information may include:

in response to that the downlink control information is detected in at least one monitoring period of a first monitoring resource, a second monitoring resource is determined in the group of monitoring resources, the first monitoring resource being a monitoring resource configured for the terminal device to monitor the downlink control information; and the second monitoring resource is determined as the target monitoring resource.

The operation that the downlink control information is monitored on the target monitoring resource may include that: the downlink control information is monitored on the second monitoring resource.

In combination with the first aspect, in some implementation modes of the first aspect, the second monitoring resource may include more monitoring positions than the first monitoring resource within a unit time.

In combination with the first aspect, in some implementation modes of the first aspect, the operation that the target monitoring resource is determined based on the group of monitoring resources and the reception of the downlink control information may include:

in response to that the downlink control information is not detected in at least one monitoring period of a third monitoring resource, a fourth monitoring resource is determined in the group of monitoring resources, the third monitoring resource being a monitoring resource configured for the terminal device to monitor the downlink control information; and the fourth monitoring resource is determined as the target monitoring resource.

The operation that the downlink control information is monitored on the target monitoring resource may include that: the downlink control information is monitored on the fourth monitoring resource.

In combination with the first aspect, in some implementation modes of the first aspect, the fourth monitoring resource may include fewer monitoring positions than the third monitoring resource within a unit time.

In combination with the first aspect, in some implementation modes of the first aspect, the operation that the target monitoring resource is determined based on the group of monitoring resources may include that: the target monitoring resource is determined based on the group of monitoring resources and a basic parameter set configured for the terminal device.

In combination with the first aspect, in some implementation modes of the first aspect, the group of monitoring resources may correspond to a first basic parameter set, and the operation that the target monitoring resource is determined based on the group of monitoring resources and the basic parameter set configured for the terminal device may include:

in response to that a second basic parameter set configured for the terminal device is the same as the first basic parameter set, the target monitoring resource is determined from the group of monitoring resources; or in response to that the second basic parameter set configured for the terminal device is different from the first basic parameter set, another group of monitoring resources is determined based on the group of monitoring resources, and the target monitoring resource is determined in the another group of monitoring resources.

In combination with the first aspect, in some implementation modes of the first aspect, the operation that the another group of monitoring resources is determined based on the group of monitoring resources may include:

the another group of monitoring resources is determined based on the group of monitoring resources and a proportional relationship between a subcarrier spacing corresponding to the second basic parameter set and a subcarrier spacing corresponding to the first basic parameter set.

In combination with the first aspect, in some implementation modes of the first aspect, the operation that the another group of monitoring resources is determined based on the group of monitoring resources and the proportional relationship between the subcarrier spacing corresponding to the second basic parameter set and the subcarrier spacing corresponding to the first basic parameter set may include:

a period of a fifth monitoring resource in the group of monitoring resources is multiplied by A/B, and an interval between monitoring positions in each period of the fifth monitoring resource is multiplied by A/B.

The regulated fifth monitoring resource may be determined as a sixth monitoring resource in the another group of monitoring resources.

Herein, A may be the subcarrier spacing corresponding to the first basic parameter set, and B may be the subcarrier spacing corresponding to the second basic parameter set.

In combination with the first aspect, in some implementation modes of the first aspect, the method may further include:

the terminal device receives multiple groups of monitoring resources from the network device, the multiple groups of monitoring resources corresponding to multiple basic parameter sets.

The operation that the terminal device determines the target monitoring resource configured to monitor the downlink control information may include:

the terminal device determines at least one monitoring resource in the multiple groups of monitoring resources according to the configured basic parameter set; and the target monitoring resource is determined from the at least one monitoring resource.

In combination with the first aspect, in some implementation modes of the first aspect, the method may further include:

the terminal device receives indication information of the network device, the indication information being used to indicate a monitoring resource configured by the network device for the terminal device to monitor the downlink control information.

In combination with the first aspect, in some implementation modes of the first aspect, the operation that the terminal device determines the target monitoring resource configured to monitor the downlink control information may include:

the terminal device determines a monitoring resource indicated by the indication information as the target monitoring resource.

The operation that the downlink control information is monitored on the target monitoring resource may include:

the downlink control information is monitored on the monitoring resource indicated by the indication information.

In combination with the first aspect, in some implementation modes of the first aspect, the operation that the terminal device determines the target monitoring resource configured to monitor the downlink control information may include:

the terminal device regulates a period and/or a monitoring position of the monitoring resource indicated by the indication information and determines the regulated monitoring resource as the target monitoring resource.

The operation that the downlink control information is monitored on the target monitoring resource may include:

the downlink control information is monitored on the regulated monitoring resource.

In combination with the first aspect, in some implementation modes of the first aspect, the operation that the terminal device receives the indication information of the network device may include the following operation.

The terminal device receives downlink control information from the network device, the downlink control information including the indication information.

In combination with the first aspect, in some implementation modes of the first aspect, the operation that the target monitoring resource is determined based on the group of monitoring resources may include:

the target monitoring resource configured to monitor the downlink control information is cyclically determined from the group of monitoring resources according to a specific period.

In combination with the first aspect, in some implementation modes of the first aspect, the method may further include:

the terminal device receives high-layer signaling of the network device, the high-layer signaling being used to configure the specific period for the terminal device.

In combination with the first aspect, in some implementation modes of the first aspect, the high-layer signaling may be Radio Resource Control (RRC) signaling.

In combination with the first aspect, in some implementation modes of the first aspect, each period may include a monitoring position configured to monitor each piece of downlink control information in multilevel downlink control information, and the operation that the downlink control information is monitored on the target monitoring resource may include:

the each piece of downlink control information is monitored at the monitoring position corresponding to the downlink control information.

In combination with the first aspect, in some implementation modes of the first aspect, the target monitoring resource may not include a time-domain position configured for data transmission of the terminal device.

In combination with the first aspect, in some implementation modes of the first aspect, the target monitoring resource may not include a time-domain position configured for the network device to transmit a downlink synchronization signal or a downlink reference signal.

In combination with the first aspect, in some implementation modes of the first aspect, the target monitoring resource may further include a frequency-domain resource for each monitoring position, and the frequency-domain resource may be a specific frequency-domain width or a whole system bandwidth.

In combination with the first aspect, in some implementation modes of the first aspect, the method may further include:

the terminal device receives configuration information from the network device, the configuration information being used to configure a monitoring resource for the terminal device to initially monitor the downlink control information.

In combination with the first aspect, in some implementation modes of the first aspect, the monitoring resource for the terminal device to initially monitor the downlink control information may be determined by the network device according to at least one of:

a service feature of the terminal device and a basic parameter set configured for the terminal device.

A second aspect provides a communication method, which may include that: a network device determines at least one monitoring resource, the at least one monitoring resource being configured for a terminal device to determine a target monitoring resource configured to monitor downlink control information.

The network device transmits information of the at least one monitoring resource to the terminal device.

In combination with the second aspect, in some implementation modes of the second aspect, each monitoring resource in the at least one monitoring resource may include a periodic monitoring position.

In combination with the second aspect, in some implementation modes of the second aspect, each period may include a monitoring position configured to monitor each piece of downlink control information in multilevel downlink control information.

In combination with the second aspect, in some implementation modes of the second aspect, the method may further include:

the network device transmits indication information to the terminal device, the indication information being used to indicate a monitoring resource configured for the terminal device to monitor the downlink control information in the at least one monitoring resource.

In combination with the second aspect, in some implementation modes of the second aspect, the operation that the network device transmits the indication information to the terminal device may include:

the network device transmits the downlink control information to the terminal device, the downlink control information including the indication information.

In combination with the second aspect, in some implementation modes of the second aspect, the method may further include:

the network device transmits high-layer signaling to the terminal device, the high-layer signaling being used to configure a specific period for the terminal device and the specific period being configured for the terminal device to cyclically determine the target monitoring resource configured to monitor the downlink control information in the at least one monitoring resource according to the specific period.

In combination with the second aspect, in some implementation modes of the second aspect, the method may further include:

the network device transmits configuration information to the terminal device, the configuration information being used to configure a monitoring resource for the terminal device to initially monitor the downlink control information.

In combination with the second aspect, in some implementation modes of the second aspect, the monitoring resource for the terminal device to initially monitor the downlink control information may be determined by the network device according to at least one of:

a service feature of the terminal device and a basic parameter set configured for the terminal device.

In combination with the second aspect, in some implementation modes of the second aspect, the operation that the network device determines the at least one monitoring resource may include:

the network device determines that each monitoring resource in the at least one monitoring resource does not include a time-domain position configured for data transmission of the terminal device.

In combination with the second aspect, in some implementation modes of the second aspect, the operation that the network device determines the at least one monitoring resource may include:

the network device determines that each monitoring resource in the at least one monitoring resource does not include a time-domain position configured for the network device to transmit a downlink synchronization signal or a downlink reference signal.

In combination with the second aspect, in some implementation modes of the second aspect, the method may further include:

the network device transmits information of multiple groups of monitoring resources to the terminal device, the multiple groups of monitoring resources corresponding to multiple basic parameter sets.

A third aspect provides a terminal device, which includes units configured to execute the method in the first aspect or each implementation mode thereof.

A fourth aspect provides a network device, which includes units configured to execute the method in the second aspect or each implementation mode thereof.

A fifth aspect provides a terminal device, which includes a memory, a processor and a transceiver. The memory is configured to store a program, the processor is configured to execute the program, and when the program is executed, the processor executes the method in the first aspect through the transceiver.

A sixth aspect provides a network device, which includes a memory, a processor and a transceiver. The memory is configured to store a program, the processor is configured to execute the program, and when the program is executed, the processor executes the method in the second aspect through the transceiver.

A seventh aspect provides a computer-readable medium, which stores a program code configured to be executed by a terminal device, the program code including an instruction configured to execute the method in the first aspect.

An eighth aspect provides a computer-readable medium, which stores a program code configured to be executed by a terminal device, the program code including an instruction configured to execute the method in the second aspect.

Beneficial Effect of the Disclosure

A Beneficial Effect

According to the communication methods, terminal device and network device provided in the embodiments of the application, the flexibility in monitoring the downlink control information by the terminal device can be improved.

BRIEF DESCRIPTION OF DRAWINGS

Description of Drawings

Figure 1:
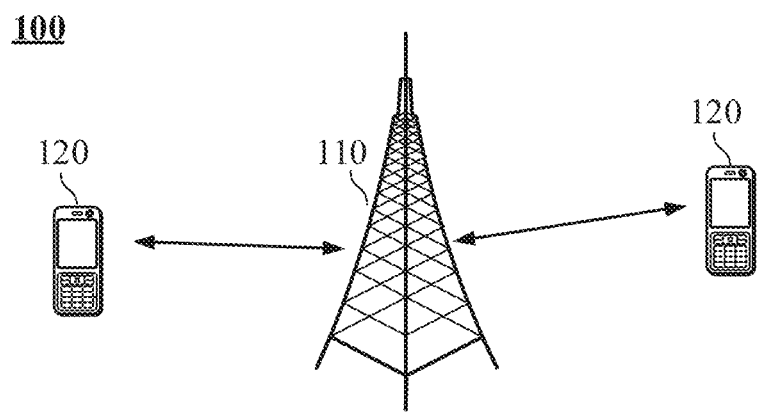

FIG. 1 is a schematic diagram of a wireless communication system according to an embodiment of the application.

Figure 2:
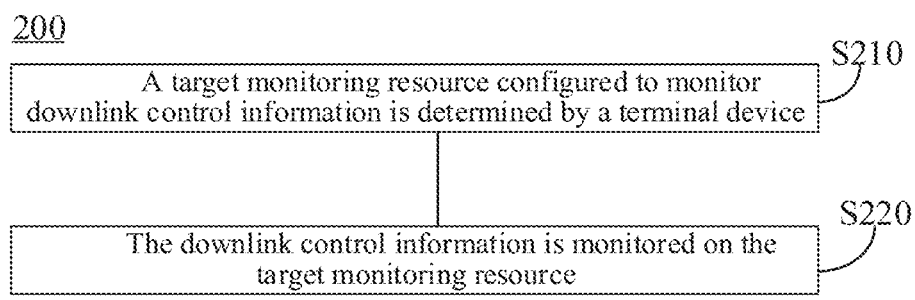

FIG. 2 is a schematic flowchart of a communication method according to an embodiment of the application.

Figure 3:
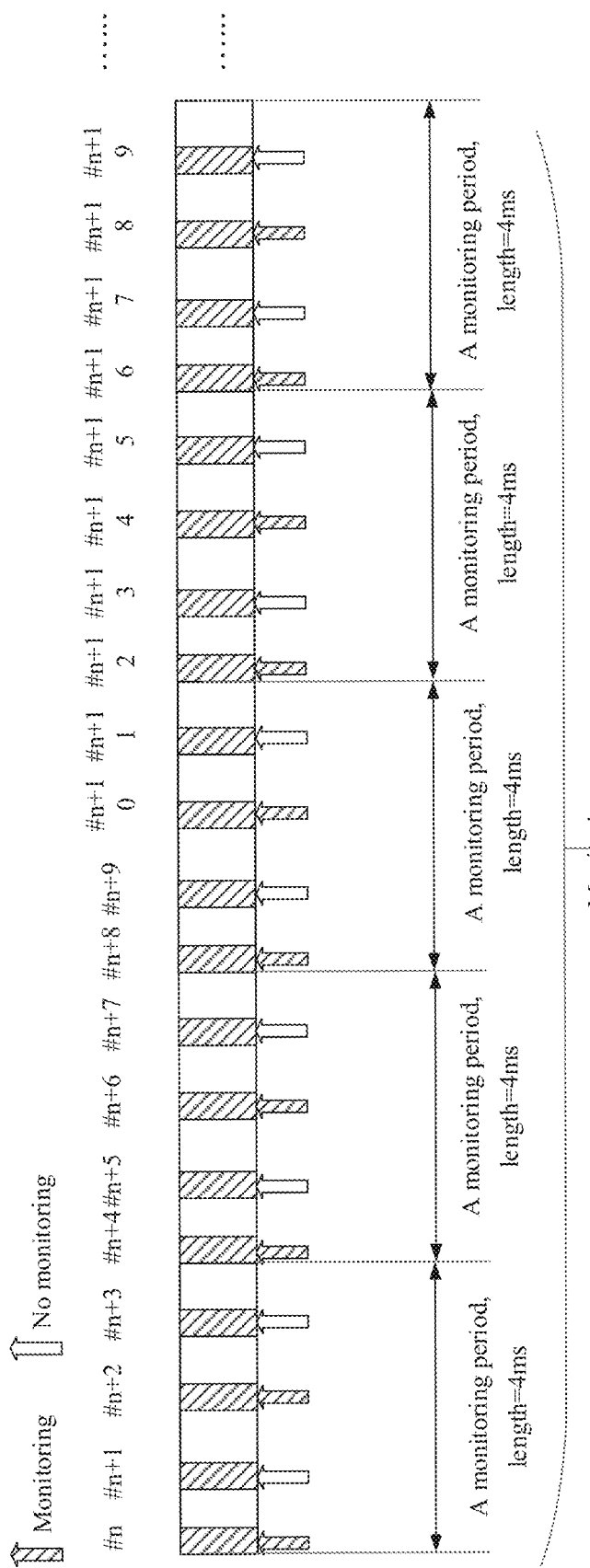

FIG. 3 is a schematic diagram of an example of a monitoring resource according to an embodiment of the application.

Figure 4:
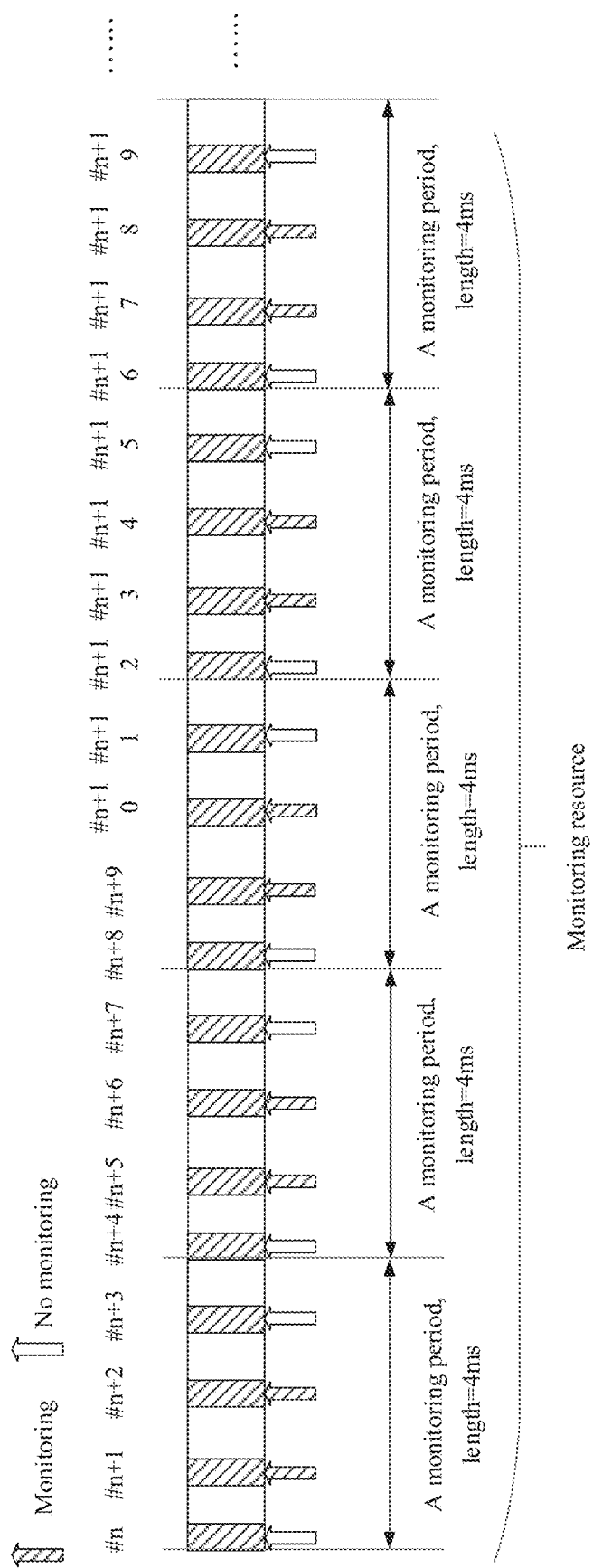

FIG. 4 is a schematic diagram of another example of a monitoring resource according to an embodiment of the application.

Figure 5:
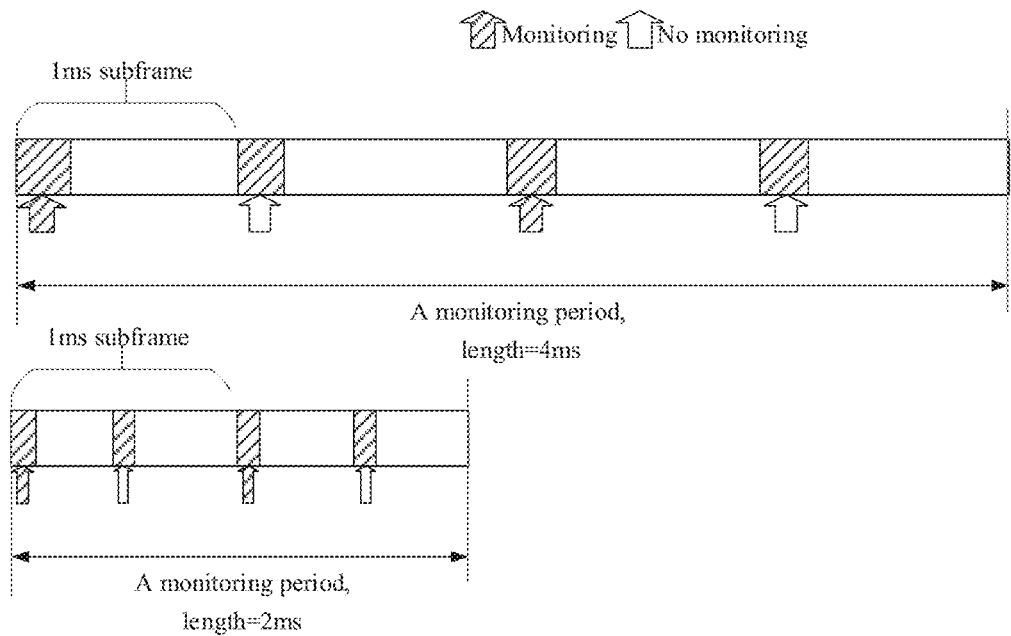

FIG. 5 is a schematic diagram of an example of monitoring resources corresponding to different basic parameter sets.

Figure 6:
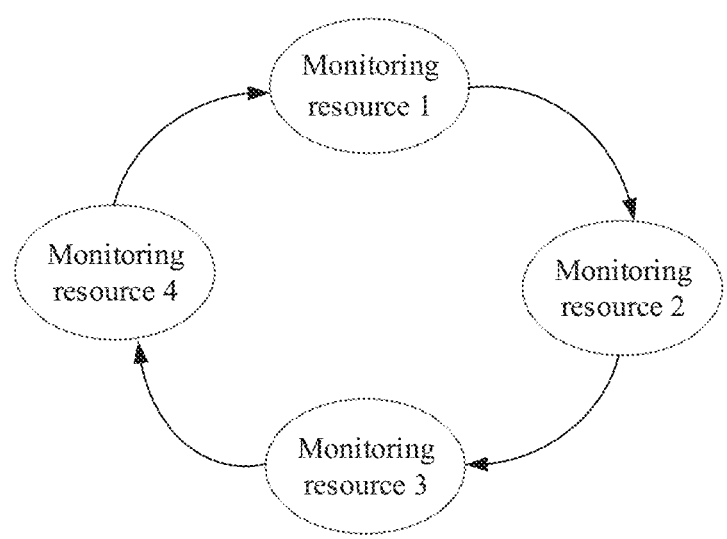

FIG. 6 is a schematic diagram of cyclic use of a monitoring resource according to a specific period.

Figure 7:
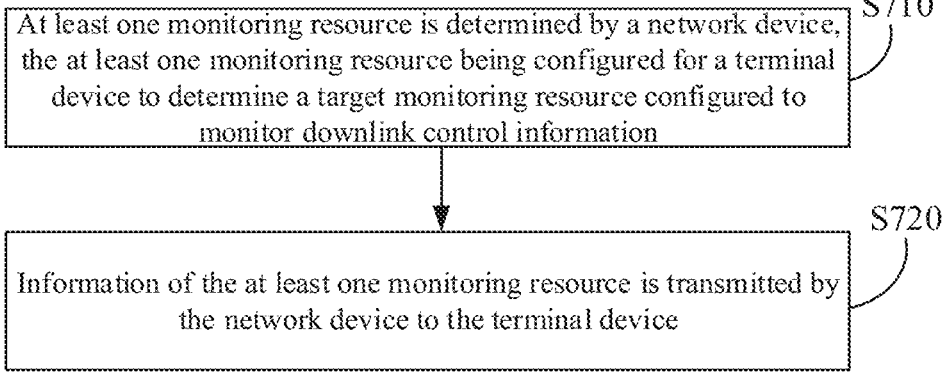

FIG. 7 is a schematic flowchart of a communication method according to another embodiment of the application.

Figure 8:
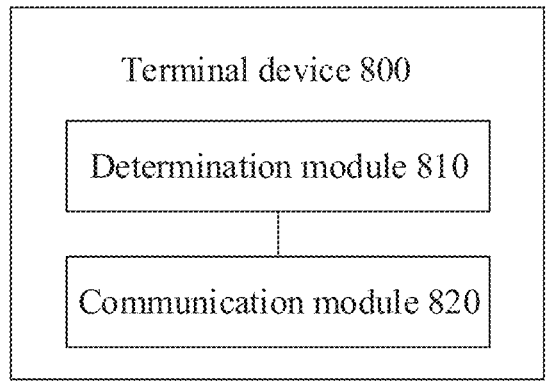

FIG. 8 is a schematic block diagram of a terminal device according to an embodiment of the application.

Figure 9:
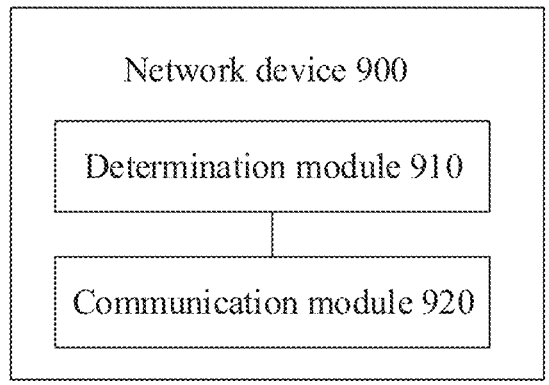

FIG. 9 is a schematic block diagram of a network device according to an embodiment of the application.

Figure 10:
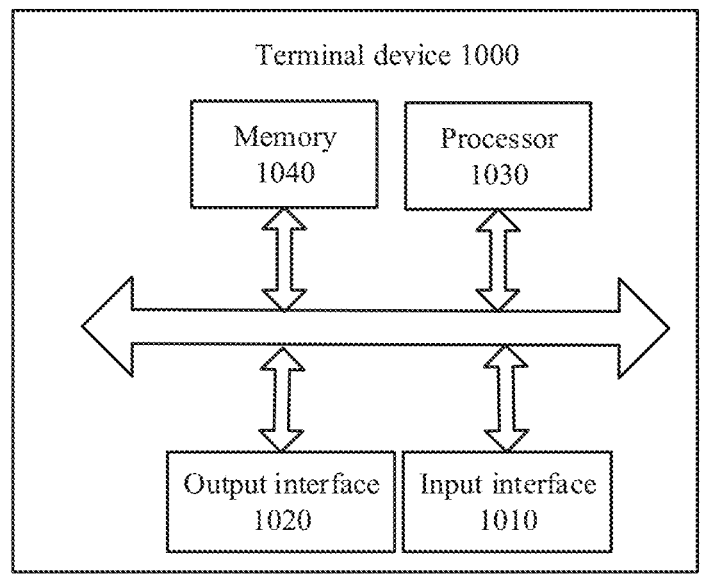

FIG. 10 is a schematic block diagram of a terminal device according to another embodiment of the application.

Figure 11:
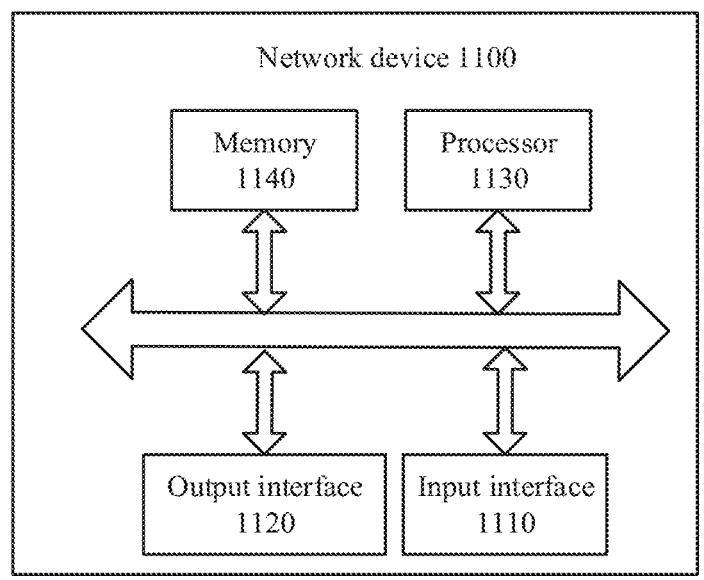

FIG. 11 is a schematic block diagram of a network device according to another embodiment of the application.

DETAILED DESCRIPTION

Preferred Implementation Modes of the Disclosure

The technical solutions in the embodiments of the application will be described below in combination with the drawings.

The technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

FIG. 1 illustrates a wireless communication system 100 to which the embodiments of the application are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the network device may be a relay station, an access point, a vehicle-mounted device, a wearable device, a network-side device in a future 5G network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, other processing device connectable to a wireless modem, a vehicle-mounted device, a wearable device, a terminal device in a future 5G network, a terminal device in a future evolved PLMN or the like.

Optionally, the terminal device 120 may perform Device to Device (D2D) communication.

Optionally, the 5G system or network may also be called an NR system or network.

One network device and two terminal devices are exemplarily shown in FIG. 1. Optionally, the wireless communication system 100 may include multiple network devices, and except two terminal devices, other number of terminal devices may be included in coverage of each network device. There are no limits made thereto in the embodiments of the application.

Optionally, the wireless communication system 100 may further include other network entity such as a network controller and a mobility management entity. There are no limits made thereto in the embodiments of the application.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

FIG. 2 is a schematic flowchart of a communication method 200 according to an embodiment of the application. The method 200 may be executed by a terminal device in the wireless communication system in FIG. 1. As shown in FIG. 2, the method 200 includes the following operations.

In S210, A target monitoring resource configured to monitor downlink control information is determined by the terminal device.

In S220, the downlink control information is monitored on the target monitoring resource.

In the embodiment of the application, the target monitoring resource includes a periodic time-domain resource. For convenient description, a period of the periodic time-domain resource is recorded as a monitoring period, and each monitoring period includes a monitoring position configured to monitor the downlink control information. That is, the target monitoring resource includes a periodic monitoring position. Optionally, each monitoring position in each monitoring period may also correspond to a specific frequency-domain width, or may also correspond to a whole system bandwidth. That is, the target monitoring resource may not only include the periodic time-domain resource but also include a certain frequency-domain resource.

It is to be understood that, in the embodiment of the application, the time-domain resource in the target monitoring resource may be of a subframe granularity, or may also be of a symbol granularity. A time granularity of the target monitoring resource is not limited in the embodiment of the application.

The periodic time-domain resource in the target monitoring resource is introduced below. Exemplarily but unlimitedly, as shown in FIG. 3, the monitoring period is 4 milliseconds (ms), and each monitoring period may include monitoring positions that may be configured to monitor the downlink control information, for example, first and third subframes. Optionally, each monitoring period may further include positions that cannot be configured to monitor the downlink control information, for example, a second subframe and a fourth subframe. Then, a set of these periodic subframes forms the target monitoring resource. That is, the target monitoring resource may include {#n, #n+2, #n+4, #n+6, #n+8, #n+10, #n+12, #n+14, #n+16, #n+18, . . . }. Then, the terminal device may monitor the downlink control information on the first subframe and third subframe in each monitoring period and not monitor the downlink control information on the second subframe and the fourth subframe. For another example, the monitoring positions in each monitoring period may be sparse monitoring positions. For example, monitoring is performed on first one or more subframes in each monitoring period and not performed on the other subframes, or monitoring is performed on middle one or more subframes in each monitoring period and not performed on the other subframes, or monitoring may be performed on last one or more subframes in each monitoring period and not performed on the other subframes. As shown in FIG. 4, the second and third subframes in each monitoring period (4 ms) are used for monitoring the downlink control information (4 ms) and the first and fourth subframes cannot be used for monitoring the downlink control information; and then a set of these periodic subframes forms the target monitoring resource, that is, the target monitoring resource may include {#n+1, #n+2, #n+5, #n+6, #n+9, #n+13, #n+14, #n+17, #n+18, . . . }.

It is to be understood that there are no limits made to the number of the monitoring positions in each monitoring period, which may be one or more than one, and positions where the monitoring positions are in each monitoring period are not limited too in the embodiment of the application. For example, the monitoring positions may be in front, middle or tail of each monitoring period. For example, the monitoring period is 4 ms, and the monitoring positions in the period may include one or more subframes in four subframes. If one subframe is included, the subframe may be any subframe in the four subframes. Or if at least two subframes are included, the at least two subframes may be continuous or discontinuous. For example, the second subframe and the third subframe may be included, or the first subframe and the third subframe may be included, or the third subframe and the fourth subframe may be included.

It is also to be understood that the monitoring position in each monitoring period may be a complete subframe or may also be a partial subframe. Herein, the complete subframe indicates that the terminal device may occupy all (7 or 14) symbols in the subframe to monitor the downlink control information, and the partial subframe indicates that the terminal device may only occupy part of symbols in the subframe to monitor the downlink control information and does not monitor the downlink control information on the other part of symbols in the subframe. For example, the partial subframe includes first two symbols of a subframe, that is, the terminal device monitors the downlink control information on the first two symbols of the subframe and does not monitor the downlink control information on other symbols of the subframe. Or last three symbols of the subframe may also be included, that is, the terminal device monitors the downlink control information on the last three symbols of the subframe and does not monitor the downlink control information on the other symbols of the subframe. Or middle two symbols of the subframe may also be included, that is, the terminal device monitors the downlink control information on the middle two symbols of the subframe and does not monitor the downlink control information on the other symbols of the subframe.

It is to be noted that each monitoring period may only include the monitoring position that can be used to monitor the downlink control information and then, in each monitoring period, the terminal device may monitor the downlink control information at the monitoring positions that can be used to monitor the downlink control information and does not monitor the downlink control information on other time-domain resources in each monitoring period. Optionally, each monitoring period may further include the positions that cannot be used to monitor the downlink control information. For example, when a network device schedules the terminal device for data transmission on one or more slots, the positions that cannot be used to monitor the downlink control information may include a position configured for data transmission of the terminal device. Optionally, the positions that cannot be used to monitor the downlink control information in each monitoring period may further include a position configured for the network device to transmit a downlink synchronization signal or a downlink reference signal. That is, the target monitoring resource may not include any time-domain resource configured for the terminal device to transmit data or may also not include any time-domain resource configured for the network device to transmit a downlink synchronization signal and a downlink reference signal, namely the terminal device does not monitor the downlink control information on the time-domain resource configured for data transmission and also does not monitor the downlink control information on the time-domain resource configured for the network device to transmit the downlink synchronization signal and the downlink reference signal. Therefore, power consumption may be reduced.

Optionally, in some embodiments, the terminal device may determine the target monitoring resource configured to monitor the downlink control information, so that flexibility in monitoring of the downlink control information is improved. Optionally, the network device may pre-configure a group of monitoring resources for the terminal device. The group of monitoring resources may include at least one monitoring resource, each monitoring resource in the at least one monitoring resource includes a periodic time-domain resource, each monitoring period may include monitoring positions that may be used to monitor the downlink control information, and respective monitoring resources corresponds to different monitoring periods, monitoring positions or the like. Optionally, if the at least one monitoring resource pre-configured by the network device includes multiple monitoring resources, the terminal device may select the target monitoring resource configured to monitor the downlink control information from the multiple monitoring resources, namely the target monitoring resource is a monitoring resource in the multiple monitoring resources. Optionally, the terminal device may also regulate a first monitoring resource in the multiple monitoring resources, for example, regulating a monitoring period of the first monitoring resource or the number of monitoring positions in each monitoring period, and determine the regulated first monitoring resource as the target monitoring resource.

Optionally, if the at least one monitoring resource pre-configured by the network device includes only one monitoring resource, that is, the network device configures only one monitoring resource for the terminal device, and if the terminal device monitors the downlink control information based on the monitoring resource, flexibility is relatively poor. Therefore, the terminal device may regulate the monitoring resource based on the demands for the opportunities of monitoring the downlink control information, for example, regulating a monitoring period or monitoring positions in each monitoring period, and determine the regulated monitoring resource as the target monitoring resource. For example, if the terminal device determines that the monitoring opportunities are required to be increased, the terminal device may shorten the monitoring period or increase the number of the monitoring positions in each monitoring period; or if the terminal device determines that the monitoring opportunities are required to be decreased, the terminal device may prolong the monitoring period or decrease the number of the monitoring positions in each monitoring period.

According to the communication method of the embodiment of the application, the terminal device may determine by itself the target monitoring resource to be used to monitor the downlink control information, so that the flexibility in monitoring of the downlink control information can be improved. Optionally, the terminal device may determine the target monitoring resource in the multiple pre-configured monitoring resources based on the demands for the opportunities for monitoring the downlink control information, or may also regulate the pre-configured monitoring resource based on the demands for the downlink monitoring resource and determine the regulated monitoring resource as the target monitoring resource, so that the flexibility in monitoring of the downlink control information by the terminal device is improved.

Optionally, the terminal device may determine the target monitoring resource in the at least one monitoring resource or the group of monitoring resources in combination with historical reception of the downlink control information. For example, if the terminal device does not monitor the downlink control information in at least one monitoring period, that is, there is not so much downlink control information configured for uplink scheduling or downlink allocation, there are not so many monitoring positions required in each monitoring period, or monitoring is not required to be executed too frequently, or the monitoring positions within a unit time are not required to be distributed too densely, so that the terminal device may select a monitoring resource with relatively sparse monitoring positions from the group of monitoring resources or the at least one monitoring resource as the target monitoring resource. Therefore, power consumption of the terminal device may be reduced.

Optionally, the terminal device may determine the target monitoring resource in the at least one monitoring resource or the group of monitoring resources in combination with the historical reception of the downlink control information. For example, if the terminal device monitors the downlink control information in at least one monitoring period, that is, there is relatively more downlink control information used for uplink scheduling or downlink allocation, many monitoring positions are required in each monitoring period, or many monitoring positions are required within a unit time, so that the terminal device may select the monitoring resource with relatively dense monitoring positions from the at least one monitoring resource or the group of monitoring resources as the target monitoring resource. Therefore, the monitoring opportunities may be increased, and a delay in receiving the downlink control information may be decreased.

Optionally, in some embodiments, the method further includes the following operations.

The terminal device receives information of a group of monitoring resources from a network device.

The operation that the terminal device determines the target monitoring resource configured to monitor the downlink control information includes:

the target monitoring resource is determined based on the group of monitoring resources.

Specifically, the network device may transmit the information of the group of monitoring resources to the terminal device. Optionally, the network device may configure the information of the group of monitoring resources for the terminal device through high-layer signaling, so that the terminal device may determine the target monitoring resource based on the group of monitoring resources. Optionally, the terminal device may directly determine the target monitoring resource in the group of monitoring resources, and may also regulate a first monitoring resource in the group of monitoring resources, for example, regulating a monitoring period or monitoring positions, and determine the regulated first monitoring resource as the target monitoring resource.

Optionally, in some embodiments, the operation that the target monitoring resource is determined based on the group of monitoring resources includes:

the target monitoring resource is determined based on the group of monitoring resources and the reception of the downlink control information.

Specifically, the terminal device may determine the target monitoring resource in the group of monitoring resources according to the reception of the downlink control information within a period of time before a present moment, namely the target monitoring resource is a monitoring resource in the group of monitoring resources. Or, the terminal device may regulate the first monitoring resource in the group of monitoring resources based on the reception of the downlink control information and then determine the regulated first monitoring resource as the target monitoring resource. Optionally, the terminal device may regulate the group of monitoring resources, for example, scale the monitoring periods by adopting the same proportion and scale an interval between the monitoring positions in each monitoring period according to the same proportion. For example, if the downlink control information is not received within a period of time, for example, one or more monitoring periods, the terminal device determines that the number of monitoring times is required to be decreased, and then the terminal device may select the monitoring resource with a smaller number of monitoring times, relative to a monitoring resource presently adopted by the terminal device, from the group of monitoring resources as the target monitoring resource. Optionally, if the terminal device presently adopts a second monitoring resource to monitor the downlink control information, the terminal device may regulate a monitoring parameter of the second monitoring resource, for example, prolonging the monitoring period or decreasing the number of the monitoring positions in each monitoring period, thereby decreasing the number of monitoring times within a unit time. For another example, if one or more pieces of downlink control information are received within a period of time, for example, one or more monitoring periods, the terminal device determines that the number of monitoring times is required to be increased, and then the terminal device may select the monitoring resource with a larger number of monitoring times, relative to the monitoring resource presently adopted by the terminal device, from the group of monitoring resources as the target monitoring resource. Optionally, if the terminal device presently adopts the second monitoring resource to monitor the downlink control information, the terminal device may regulate the monitoring parameter of the second monitoring resource, for example, shortening the monitoring period or increasing the number of the monitoring positions in each monitoring period, thereby increasing the number of monitoring times within a unit time.

Optionally, in some embodiments, the operation that the target monitoring resource is determined based on the group of monitoring resources and the reception of the downlink control information includes the following operations.

If the downlink control information is detected by monitoring in at least one monitoring period of a first monitoring resource, a second monitoring resource is determined in the group of monitoring resources, the first monitoring resource being a monitoring resource presently used for the terminal device to monitor the downlink control information.

The second monitoring resource is determined as the target monitoring resource.

The operation that the downlink control information is monitored on the target monitoring resource includes:

the downlink control information is monitored on the second monitoring resource.

Herein, the second monitoring resource includes more monitoring positions than the first monitoring resource within a unit time.

Specifically, if the terminal device presently adopts the first monitoring resource to monitor the downlink control information but monitors the downlink control information in one or more monitoring periods of the first monitoring resource, it can be understood that there is relatively more pieces of downlink control information. Under this condition, monitoring opportunities are required to be increased to decrease the delay in receiving the downlink control information. Therefore, the terminal device may determine the second monitoring resource in the group of monitoring resources, the second monitoring resource including richer resources than the first monitoring resource or including more monitoring positions within a unit time. For example, if the first monitoring period takes 4 ms as a monitoring period and each monitoring period includes two monitoring positions, the monitoring resource which takes 4 ms as a monitoring period and includes three monitoring positions in each monitoring period may be determined as the target monitoring resource, or the monitoring resource which takes 3 ms as a monitoring period and includes two monitoring positions in each period may be determined as the target monitoring resource. That is, the monitoring resource including more monitoring positions within the unit time in the group of monitoring resources may be determined as the target monitoring resource. Optionally, the terminal device may further regulate the monitoring period of the first monitoring resource or the monitoring positions in each monitoring period and determine the regulated first monitoring resource as the target monitoring resource. For example, are increased, thereby increasing the number of monitoring times of the regulated first monitoring resource within the unit time may be increased by shortening the monitoring period or increasing the monitoring positions in each monitoring period.

Optionally, in some embodiments, the operation that the target monitoring resource is determined based on the group of monitoring resources and the reception of the downlink control information includes the following operations.

If the downlink control information is not detected by monitoring in at least one monitoring period of a third monitoring resource, the terminal device determines a fourth monitoring resource in the group of monitoring resources.

The fourth monitoring resource is determined as the target monitoring resource.

The operation that the downlink control information is monitored on the target monitoring resource includes the following operation:

the downlink control information is monitored on the fourth monitoring resource.

The fourth monitoring resource includes fewer monitoring positions than the third monitoring resource within a unit time.

Specifically, if the terminal device adopts the third monitoring resource to monitor the downlink control information but does not detect the downlink control information in at least one monitoring period of the third monitoring resource, it can be understood that there is relatively less downlink control information. Under this condition, the number of monitoring times is required to be decreased to reduce the power consumption of the terminal. Therefore, the terminal device may determine the fourth monitoring resource in the group of monitoring resources, the fourth monitoring resource including fewer resources than the third monitoring resource or including relatively fewer monitoring positions within a unit time. For example, if the third monitoring period takes 4 ms as a monitoring period and each monitoring period includes two monitoring positions, the monitoring resource which takes 4 ms as a monitoring period and includes one monitoring position in each monitoring period may be determined as the target monitoring resource, or the monitoring resource which takes 3 ms as a monitoring period and includes one monitoring position in each period may be determined as the target monitoring resource. That is, the monitoring resource including fewer monitoring positions within the unit time in the group of monitoring resources may be determined as the target monitoring resource. Optionally, the terminal device may further regulate the monitoring period of the third monitoring resource or the monitoring positions in each monitoring period and determine the regulated third monitoring resource as the target monitoring resource. For example, the monitoring period is prolonged or the monitoring positions in each monitoring period are decreased, thereby decreasing the number of monitoring times of the regulated third monitoring resource within the unit time.

According to the communication method of the embodiment of the application, when there is relatively more downlink control information, the number of the monitoring positions within the unit time may be increased, thereby decreasing the delay in receiving the downlink control information; and when there is relatively less downlink control information, the number of the monitoring positions within the unit time may be decreased, thereby reducing the power consumption of the terminal. Therefore, the monitoring resource configured to monitor the downlink control information may be flexibly regulated based on the demands for the monitoring opportunities for the downlink control information to further achieve a compromise between the power consumption of the terminal and the delay in receiving the downlink control information.

Optionally, in some embodiments, the operation that the target monitoring resource is determined based on the group of monitoring resources includes the following operation.

The target monitoring resource is determined based on the group of monitoring resources and a basic parameter set configured for the terminal device.

Specifically, the group of monitoring resources may correspond to a basic parameter set. The basic parameter set corresponding to the group of monitoring resources may be understood as a reference basic parameter set. The terminal device may determine the target monitoring resource according to a first basic parameter set configured for the terminal device and the reference basic parameter set. For example, if the first basic parameter set is the same as the reference basic parameter set, the terminal device may determine the target monitoring resource in the group of monitoring resources. A method for determining the target monitoring resource in the group of monitoring resources may refer to the aforementioned embodiments and will not be elaborated herein. Or, if the first basic parameter set is different from the reference basic parameter set, the terminal device may regulate the group of monitoring resources to obtain another group of monitoring resources and then determine the target monitoring resource in the another group of monitoring resources. A method for determining the target monitoring resource in the another group of monitoring resources may refer to related descriptions about determination of the target monitoring resource in the group of monitoring resources in the aforementioned embodiments and will not be elaborated herein. Or if the first basic parameter set is different from the reference basic parameter set, the network device may further configure another group of monitoring resources for the terminal device, the another group of monitoring resources corresponding to the first basic parameter set. That is, the network device may configure different monitoring resources with regard to different basic parameters.

Optionally, in some embodiments, the group of monitoring resources corresponds to a first basic parameter set, and the operation that the target monitoring resource is determined based on the group of monitoring resources and the basic parameter set configured for the terminal device may include the following operations.

If a second basic parameter set configured for the terminal device is the same as the first basic parameter set, the target monitoring resource is determined in the group of monitoring resources or if the second basic parameter set configured for the terminal device is different from the first basic parameter set, another group of monitoring resources is determined based on the group of monitoring resources.

The target monitoring resource is determined in the another group of monitoring resources.

Specifically, the group of monitoring resources may correspond to the first basic parameter set. If the basic parameter set configured for the terminal device is the second basic parameter set and the second basic parameter set is the same as the first basic parameter set, the target monitoring resource may be determined in the group of monitoring resources. The method for determining the target monitoring resource in the group of monitoring resources refers to the aforementioned embodiments and will not be elaborated herein. If the second basic parameter set is different from the first basic parameter set, the terminal device may determine the first basic parameter set as the reference basic parameter set, determine the another group of monitoring resources based on the group of monitoring resources and then determine the target monitoring resource in the another group of monitoring resources.

Optionally, in some embodiments, the operation that the another group of monitoring resources is determined based on the group of monitoring resources includes the following operation.

The another group of monitoring resources is determined based on the group of monitoring resources and a proportional relationship between a subcarrier spacing corresponding to the second basic parameter set and a subcarrier spacing corresponding to the first basic parameter set.

Specifically, in an NR system, a physical layer may support multiple basic parameter sets and different basic parameter sets may be distinguished by different subcarrier spacings. The basic parameter set corresponding to a certain subcarrier spacing may be determined as the reference basic parameter set. For example, the basic parameter set corresponding to the subcarrier spacing 15 KHz may be determined as the reference basic parameter set. In a time domain, a 1 ms subframe includes two slots and each slot includes 7 or 14 Orthogonal Frequency Division Multiplexing (OFDM) symbols. The subcarrier spacings of the other basic parameter sets are valued to be 15 KHz*2n, and the slot amount of each subframe is 2n*the slot amount of a subframe corresponding to the reference basic parameter set. Therefore, the terminal device may scale the monitoring resources according to a scaling manner of the basic parameter set, and the monitoring resources corresponding to the other basic parameter sets may also be scaled by 2n.

Optionally, in some embodiments, the operation that the another group of monitoring resources is determined based on the group of monitoring resources and the proportional relationship between the subcarrier spacing corresponding to the second basic parameter set and the subcarrier spacing corresponding to the first basic parameter set includes the following operations.

A monitoring period of a fifth monitoring resource in the group of monitoring resources is multiplied by A/B, and an interval between monitoring positions in each monitoring period of the fifth monitoring resource is multiplied by A/B.

The regulated fifth monitoring resource is determined as a sixth monitoring resource in the another group of monitoring resources.

Herein, A is the subcarrier spacing corresponding to the first basic parameter set, and B is the subcarrier spacing corresponding to the second basic parameter set.

As shown in FIG. 5, the basic parameter set for 15 KHz is the reference basic parameter set and corresponds to the first monitoring resource with a monitoring period being 4 ms; and each monitoring period includes monitoring positions, i.e., the first subframe and the third subframe. In such case, the second monitoring resource corresponding to the basic parameter set for 30 KHz may be scaled by 2n. Since 30 KHz is scaled by 21 relative to 15 KHz, the second monitoring resource may be scaled by 21 relative to the first monitoring resource. Then, the monitoring period of the second monitoring resource is 2 ms, the monitoring positions in each monitoring period are kept unchanged, and the interval between the monitoring positions is scaled according to a scaling proportion, namely the interval between two monitoring positions is changed from 2 ms to 1 ms, so that the number of the monitoring positions within a unit time is increased. Therefore, the basic parameter set for 30 KHz correspond to more monitoring resources than the basic parameter set for 15 KHz, there are relatively more monitoring opportunities, the receiving delay of the downlink control information is relatively short, and the power consumption of the terminal device is also relatively high. Furthermore, the terminal device, after determining the monitoring resource corresponding to the configured basic parameter set, may determine the target monitoring resource based on the reception of the downlink control information. A specific method may refer to the aforementioned embodiments and, for simplicity, will not be elaborated herein.

Optionally, in some embodiments, the method may further include the following operation.

The terminal device receives indication information of the network device, the indication information being used to indicate a monitoring resource configured by the network device for the terminal device to monitor the downlink control information.

That is, the network device may pre-configure at least one monitoring resource for the terminal device, and the network device may dynamically indicate the specific monitoring resource for the terminal device to monitor the downlink control information in the at least one monitoring resource through the indication information. For example, the at least one monitoring resource may be numbered, the indication information may indicate a resource number, and the terminal device may determine the specific monitoring resource configured by the network device according to the resource number.

Optionally, in some embodiments, the operation that the terminal device receives the indication information of the network device includes the following operation.

The terminal device receives downlink control information from the network device, the downlink control information including the indication information.

The terminal device may bear the indication information through the downlink control information and dynamically indicate to the terminal device, through the downlink control information, which monitoring resource to be adopted for monitoring.

Optionally, in some embodiments, the operation that the terminal device determines the target monitoring resource configured to monitor the downlink control information includes the following operation.

The terminal device determines the monitoring resource indicated by the indication information as the target monitoring resource.

The operation that the downlink control information is monitored on the target monitoring resource includes the following operation.

The downlink control information is monitored on the monitoring resource indicated by the indication information.

Optionally, the terminal device may directly determine the monitoring resource indicated by the indication information as the target monitoring resource, thereby monitoring the downlink control information on the monitoring resource indicated by the indication information.

The operation that the terminal device determines the target monitoring resource configured to monitor the downlink control information includes the following operation.

The terminal device regulates a monitoring period and/or monitoring positions of the monitoring resource indicated by the indication information and determines the regulated monitoring resource as the target monitoring resource.

The operation that the downlink control information is monitored on the target monitoring resource includes the following operation.

The downlink control information is monitored on the regulated monitoring resource.

Optionally, the terminal device may regulate the monitoring resource indicated by the indication information and determine the regulated monitoring resource as the target monitoring resource. For example, the terminal device may regulate the monitoring period and/or the monitoring positions. Optionally, the terminal device may regulate the monitoring period and/or the monitoring positions based on the reception of the downlink control information. A specific method may refer to the aforementioned embodiments and will not be elaborated herein.

Optionally, in some embodiments, the operation that the target monitoring resource is determined based on the group of monitoring resources includes the following operation.

The target monitoring resource configured to monitor the downlink control information is cyclically determined in the group of monitoring resources according to a specific period.

That is, the terminal device may cyclically adopt the group of monitoring resources to monitor the downlink control information. Specifically, the terminal device may pre-configure the group of monitoring resources. If the group of monitoring resources includes multiple monitoring resources, the terminal device may adopt the multiple monitoring resources in turns to monitor the downlink control information according to a certain period. For example, as shown in FIG. 6, the multiple monitoring resources include monitoring resource 1~monitoring resource 4, the period is T, the monitoring resource 1 is started to be adopted for monitoring at the present moment t, the monitoring resource 2 is started to be adopted for monitoring at a moment t+T, the monitoring resource 3 is started to be adopted for monitoring at a moment t+2T, the monitoring resource 4 is started to be adopted for monitoring at a moment t+3T, and so on. The terminal device may cyclically adopt the multiple monitoring resources to monitor the downlink control information in this manner.

Optionally, in some embodiments, the method further includes the following operation.

The terminal device receives high-layer signaling of the network device, the high-layer signaling being used to configure the specific period for the terminal device.

Specifically, the specific period may be considered as a switching period during which one monitoring resource is switched to another monitoring resource. The network device may configure the switching period through the high-layer signaling, so that the terminal device may cyclically adopt the group of monitoring resources to monitor the downlink control information according to the specific period.

Optionally, in some embodiments, the high-layer signaling is Radio Resource Control (RRC) signaling.

Optionally, the network device may pre-configure multiple groups of monitoring resources for the terminal device, each monitoring resource corresponds to a basic parameter set, namely the multiple groups of monitoring resources are monitoring resources for multiple basic parameter sets, and each group of monitoring resources may include at least one monitoring resource. Under this condition, the terminal device may determine the group of monitoring resources corresponding to the configured basic parameter set and determine the target monitoring resource in the group of monitoring resources.

Optionally, in some embodiments, each monitoring period includes monitoring positions configured to monitor each piece of downlink control information in multilevel downlink control information, and the operation that the downlink control information is monitored on the target monitoring resource includes the following operation.

Each piece of downlink control information is monitored at monitoring position corresponding to the downlink control information.

Specifically, the network device may perform downlink allocation or uplink scheduling through the multilevel downlink control information. For example, a common Physical Downlink Control Channel (PDCCH) may further indicate information of the PDCCH. Then, the target monitoring resource may include the monitoring position for each piece of downlink control information in the multilevel downlink control information, so that the terminal device may monitor each piece of downlink control information at the corresponding monitoring position.

Optionally, the target monitoring resource does not include a time-domain position configured for data transmission of the terminal device.

Specifically, if the network device schedules the terminal device for data transmission at one or more slots, the target monitoring resource may not include the time-domain position configured for data transmission of the terminal device, so that the terminal device may not monitor the downlink control information at the position which is for data transmission, and the power consumption of the terminal may further be reduced.

Optionally, the target monitoring resource does not include a time-domain position configured for the network device to transmit a downlink synchronization signal or a downlink reference signal.

Specifically, if the network device may transmit the downlink synchronization signal or the downlink reference signal at some time-domain positions, these time-domain positions may be not configured to monitor the downlink control information, and then the target monitoring resource may not include the time-domain positions configured for the network device to transmit the downlink synchronization signal and the downlink reference signal, so that the terminal device may not monitor the downlink control information at the positions configured to transmit the downlink synchronization signal and the downlink reference signal, and the power consumption of the terminal may further be reduced.

Optionally, in some embodiments, the target monitoring resource further includes a frequency-domain resource for each monitoring position, and the frequency-domain resource is a specific frequency-domain width or a whole system band width.

That is, in the target monitoring resource, the time-domain resource may be a periodic time-domain resource, and the frequency-domain resource may be the whole system bandwidth or may also be a specific frequency-domain width. The specific frequency-domain width may also be configured for the terminal device by the network device.

Optionally, in some embodiments, the method further includes the following operation.

The terminal device receives configuration information from the network device, the configuration information being used to configure a monitoring resource for the terminal device to initially monitor the downlink control information.

The monitoring resource for the terminal device to initially monitor the downlink control information is determined by the network device according to at least one of:

a service feature of the terminal device and the basic parameter set configured for the terminal device.

For example, the network device may configure the initial monitoring resource for the terminal device. The network device may determine the initial monitoring resource according to the service feature of the terminal device. If services of the terminal device mainly include ultralow-delay services, the network device may configure a monitoring resource with relatively more monitoring positions within a unit time for the terminal device as the initial monitoring resource. Or if the services of the terminal device have relatively low delay requirements, the network device may configure a monitoring resource with relatively few monitoring positions within a unit time for the terminal device as the initial monitoring resource. Optionally, the network device may also determine the initial monitoring resource according to the basic parameter set configured for the terminal device. For example, if the basic parameter set configured for the terminal device is a basic parameter set with a subcarrier spacing, a monitoring resource with relatively more monitoring positions is configured, otherwise a monitoring resource with relatively few monitoring positions may be configured.

Optionally, if the terminal device adopts a cyclical pattern to switch the monitoring resources, the initial monitoring resource may indicate the first monitoring resource for the terminal device.

The communication method according to the embodiments of the application is described above in combination with FIG. 2 to FIG. 6 in detail from the aspect of a terminal device. A communication method according to the embodiments of the application will be described below in combination with FIG. 7 in detail from the aspect of a network device. It is to be understood that descriptions made on a network device side correspond to descriptions made on a terminal device side and similar descriptions may refer to the above and, for avoiding repetitions, will not be elaborated herein.

FIG. 7 is a schematic flowchart of a communication method 700 according to another embodiment of the application. As shown in FIG. 7, the method 700 includes the following operations.

In S710, at least one monitoring resource is determined by a network device, the at least one monitoring resource being configured for a terminal device to determine a target monitoring resource configured to monitor downlink control information.

In S720, information of the at least one monitoring resource is transmitted by the network device to the terminal device.

Optionally, in some embodiments, each monitoring resource in the at least one monitoring resource includes a periodic monitoring position.

Optionally, in some embodiments, each period includes a monitoring position configured to monitor each piece of downlink control information in multilevel downlink control information.

Optionally, in some embodiments, the method further includes the following operation.

The network device transmits indication information to the terminal device, the indication information being used to indicate a monitoring resource configured for the terminal device to monitor the downlink control information in the at least one monitoring resource.

Optionally, in some embodiments, the operation that the network device transmits the indication information to the terminal device includes the following operation.

The network device transmits downlink control information to the terminal device, the downlink control information including the indication information.

Optionally, in some embodiments, the method further includes the following operation.

The network device transmits high-layer signaling to the terminal device, the high-layer signaling being used to configure a specific period for the terminal device and the specific period being used for the terminal device to cyclically determine the target monitoring resource configured to monitor the downlink control information in the at least one monitoring resource according to the specific period.

Optionally, in some embodiments, the method further includes the following operation.

The network device transmits configuration information to the terminal device, the configuration information being used to configure a monitoring resource for the terminal device to initially monitor the downlink control information.

Optionally, in some embodiments, the monitoring resource for the terminal device to initially monitor the downlink control information is determined by the network device according to at least one of:

a service feature of the terminal device and a basic parameter set configured for the terminal device.

Optionally, in some embodiments, the operation that the network device determines the at least one monitoring resource includes the following operation.

The network device determines that each monitoring resource in the at least one monitoring resource does not include a time-domain position configured for data transmission of the terminal device.

Optionally, in some embodiments, the operation that the network device determines the at least one monitoring resource includes the following operation.

The network device determines that each monitoring resource in the at least one monitoring resource does not include a time-domain position configured for the network device to transmit a downlink synchronization signal or a downlink reference signal.

Optionally, in some embodiments, the method further includes the following operation.

The network device transmits information of multiple groups of monitoring resources to the terminal device, the multiple groups of monitoring resources corresponding to multiple basic parameter sets.

The method embodiments of the application are described above in combination with FIG. 2 to FIG. 7 in detail and device embodiments of the application will be described below in combination with FIG. 8 to FIG. 11 in detail. It is to be understood that the device embodiments correspond to the method embodiments and similar descriptions may refer to the method embodiments.

FIG. 8 is a schematic block diagram of a terminal device 800 according to an embodiment of the application. As shown in FIG. 8, the terminal device 800 includes a determination module 810 and a communication module 820.

The determination module 810 is configured to determine a target monitoring resource configured to monitor downlink control information.

The communication module 820 is configured to monitor the downlink control information on the target monitoring resource.

Optionally, in some embodiments, the target monitoring resource includes a periodic monitoring position.

Optionally, in some embodiments, the communication module 820 is further configured to:

receive information of a group of monitoring resources from a network device.

The determination module 810 is configured to:

determine the target monitoring resource based on the group of monitoring resources.

Optionally, in some embodiments, the determination module 810 is configured to:

determine the target monitoring resource based on the group of monitoring resources and reception of the downlink control information.

Optionally, in some embodiments, the determination module 810 is configured to:

if the downlink control information is detected by monitoring in at least one monitoring period of a first monitoring resource, determine a second monitoring resource in the group of monitoring resources, the first monitoring resource being a monitoring resource configured for the terminal device to monitor the downlink control information; and determine the second monitoring resource as the target monitoring resource.

The communication module 820 is configured to:

monitor the downlink control information on the second monitoring resource.

Optionally, in some embodiments, the second monitoring resource includes more monitoring positions than the first monitoring resource within a unit time.

Optionally, in some embodiments, the determination module 810 is configured to:

if the downlink control information is not detected by monitoring in at least one period of a third monitoring resource, determine a fourth monitoring resource in the group of monitoring resources, the third monitoring resource being a monitoring resource configured for the terminal device to monitor the downlink control information; and determine the fourth monitoring resource as the target monitoring resource.

The communication module 820 is configured to:
monitor the downlink control information on the fourth monitoring resource.

Optionally, in some embodiments, the fourth monitoring resource includes fewer monitoring positions than the third monitoring resource within a unit time.

Optionally, in some embodiments, the determination module 810 is configured to:
determine the target monitoring resource based on the group of monitoring resources and a basic parameter set configured for the terminal device.

Optionally, in some embodiments, the group of monitoring resources corresponds to a first basic parameter set, and the determination unit 810 is configured to:
if a second basic parameter set configured for the terminal device is the same as the first basic parameter set, determine the target monitoring resource in the group of monitoring resources; or
if the second basic parameter set configured for the terminal device is different from the first basic parameter set, determine another group of monitoring resources based on the group of monitoring resources and determine the target monitoring resource in the another group of monitoring resources.

Optionally, in some embodiments, the determination module 810 is configured to:
determine the another group of monitoring resources based on the group of monitoring resources and a proportional relationship between a subcarrier spacing corresponding to the second basic parameter set and a subcarrier spacing corresponding to the first basic parameter set.

Optionally, in some embodiments, the determination module 810 is configured to:
multiply a period of a fifth monitoring resource in the group of monitoring resources by A/B and multiply an interval between monitoring positions in each period of the fifth monitoring resource by A/B; and
determine the regulated fifth monitoring resource as a sixth monitoring resource in the another group of monitoring resources.

Herein, A is the subcarrier spacing corresponding to the first basic parameter set, and B is the subcarrier spacing corresponding to the second basic parameter set.

Optionally, in some embodiments, the communication module 820 is further configured to:
receive multiple groups of monitoring resources from the network device, the multiple groups of monitoring resources corresponding to multiple basic parameter sets.

The determination module 810 is configured to:
determine, by the terminal device, at least one monitoring resource in the multiple groups of monitoring resources according to the configured basic parameter set; and determine the target monitoring resource in the at least one monitoring resource.

Optionally, in some embodiments, the communication module 820 is further configured to:
receive indication information of the network device, the indication information being used to indicate a monitoring resource configured by the network device for the terminal device to monitor the downlink control information.

Optionally, in some embodiments, the determination module 810 is further configured to:
determine the monitoring resource indicated by the indication information as the target monitoring resource.

The communication module 820 is further configured to:
monitor the downlink control information on the monitoring resource indicated by the indication information.

Optionally, in some embodiments, the determination module 810 is further configured to:
regulate a period and/or a monitoring position of the monitoring resource indicated by the indication information and determine the regulated monitoring resource as the target monitoring resource.

The communication module 820 is further configured to:
monitor the downlink control information on the regulated monitoring resource.

Optionally, in some embodiments, the communication module 820 is further configured to:
receive downlink control information from the network device, the downlink control information including the indication information.

Optionally, in some embodiments, the determination module 810 is further configured to:
cyclically determine the target monitoring resource configured to monitor the downlink control information in the group of monitoring resources according to a specific period.

Optionally, in some embodiments, the communication module 820 is further configured to:
receive high-layer signaling of the network device, the high-layer signaling being used to configure the specific period for the terminal device.

Optionally, in some embodiments, the high-layer signaling is RRC signaling.

Optionally, in some embodiments, each period includes a monitoring position configured to monitor each piece of downlink control information in multilevel downlink control information, and the communication module 820 is configured to:
monitor each piece of downlink control information at the monitoring position corresponding to the downlink control information.

Optionally, in some embodiments, the target monitoring resource does not include a time-domain position configured for data transmission of the terminal device.

Optionally, in some embodiments, the target monitoring resource does not include a time-domain position configured for the network device to transmit a downlink synchronization signal or a downlink reference signal.

Optionally, in some embodiments, the target monitoring resource further includes a frequency-domain resource for each monitoring position, and the frequency-domain resource is a specific frequency-domain width or a whole system bandwidth.

Optionally, in some embodiments, the communication module 820 is further configured to:
receive configuration information from the network device, the configuration information being used to configure a monitoring resource for the terminal device to initially monitor the downlink control information.

Optionally, in some embodiments, the monitoring resource for the terminal device to initially monitor the downlink control information is determined by the network device according to at least one of:
a service feature of the terminal device and the basic parameter set configured for the terminal device.

FIG. 9 is a schematic block diagram of a network device 900 according to an embodiment of the application. As shown in FIG. 9, the network device 900 includes a determination module 910 and a communication module 920.

The determination module 910 is configured to determine at least one monitoring resource, the at least one monitoring resource being configured for a terminal device to determine a target monitoring resource configured to monitor downlink control information.

The communication module 920 is configured to transmit information of the at least one monitoring resource to the terminal device.

Optionally, in some embodiments, each monitoring resource in the at least one monitoring resource includes periodic monitoring positions.

Optionally, in some embodiments, each period includes a monitoring position configured to monitor each piece of downlink control information in multilevel downlink control information.

Optionally, in some embodiments, the communication module 920 is further configured to:

transmit indication information to the terminal device, the indication information being used to indicate a monitoring resource configured for the terminal device to monitor the downlink control information in the at least one monitoring resource.

Optionally, in some embodiments, the communication module 920 is configured to:

transmit downlink control information to the terminal device, the downlink control information including the indication information.

Optionally, in some embodiments, the communication module 920 is further configured to:

transmit high-layer signaling to the terminal device, the high-layer signaling being used to configure a specific period for the terminal device and the specific period being configured for the terminal device to cyclically determine the target monitoring resource configured to monitor the downlink control information in the at least one monitoring resource according to the specific period.

Optionally, in some embodiments, the communication module 920 is further configured to:

transmit configuration information to the terminal device, the configuration information being used to configure a monitoring resource for the terminal device to initially monitor the downlink control information.

Optionally, in some embodiments, the monitoring resource for the terminal device to initially monitor the downlink control information is determined by the network device according to at least one of:

a service feature of the terminal device and a basic parameter set configured for the terminal device.

Optionally, in some embodiments, the determination module 910 is further configured to:

determine that each monitoring resource in the at least one monitoring resource does not include a time-domain position configured for data transmission of the terminal device.

Optionally, in some embodiments, the determination module 910 is further configured to:

determine that each monitoring resource in the at least one monitoring resource does not include a time-domain position configured for the network device to transmit a downlink synchronization signal or a downlink reference signal.

Optionally, in some embodiments, the communication module 920 is further configured to:

transmit information of multiple groups of monitoring resources to the terminal device, the multiple groups of monitoring resources corresponding to multiple basic parameter sets.

As shown in FIG. 10, an embodiment of the application also provides a terminal device 1000. The terminal device 1000 may be the terminal device 800 in FIG. 8, and may be configured to execute operations of the terminal device corresponding to the method 200 in FIG. 2. The terminal device 1000 includes an input interface 1010, an output interface 1020, a processor 1030 and a memory 1040. The input interface 1010, the output interface 1020, the processor 1030 and the memory 1040 may be connected through a bus system. The memory 1040 is configured to store a program, an instruction or a code. The processor 1030 is configured to execute the program instruction or code in the memory 1040 to control the input interface 1010 to receive a signal, control the output interface 1020 to transmit a signal and complete operations in the method embodiments.

It is to be understood that, in the embodiment of the application, the processor 1030 may be a Central Processing Unit (CPU) or the processor 1030 may be other universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 1040 may include a Read-Only Memory (ROM) and a Random Access Memory (RAM) and provides an instruction and data for the processor 1030. A part of the memory 1040 may further include a nonvolatile RAM. For example, the memory 1040 may further store information of a device type.

In an implementation process, each operation of the method may be completed by an integrated logic circuit of hardware in the processor 1030 or by an instruction in a software form. The operations of the method disclosed in combination with the embodiments of the application may be directly embodied to be executed and completed by a hardware processor, or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 1040. The processor 1030 reads information in the memory 1040 and completes the operations of the method in combination with hardware. No more detailed descriptions will be made herein to avoid repetitions.

In a specific implementation mode, the determination module 810 in FIG. 8 may be implemented by the processor 1030 in FIG. 10, and the communication module 820 of the terminal device 800 may be implemented by the output interface 1010 and input interface 1010 in FIG. 10.

As shown in FIG. 11, an embodiment of the application also provides a terminal device 1100. The terminal device 1100 may be the terminal device 800 in FIG. 8, and may be configured to execute operations of the terminal device corresponding to the method 200 in FIG. 2. The network device 1100 includes an input interface 1110, an output interface 1120, a processor 1130 and a memory 1140. The input interface 1110, the output interface 1120, the processor 1130 and the memory 1140 may be connected through a bus system. The memory 1140 is configured to store a program, an instruction or a code. The processor 1130 is configured to execute the program instruction or code in the memory 1140 to control the input interface 1110 to receive a signal, control the output interface 1120 to transmit a signal and complete operations in the method embodiments.

It is to be understood that, in the embodiment of the application, the processor 1130 may be a CPU or the processor 1130 may also be other universal processor, a DSP, an ASIC, an FPGA or other programmable logic device, discrete gate or transistor logic device and discrete hardware component and the like. The universal processor may be a microprocessor or the processor may also be any conventional processor and the like.

The memory 1140 may include a ROM and a RAM and provides an instruction and data for the processor 1130. A part of the memory 1140 may further include a nonvolatile RAM. For example, the memory 1140 may further store information of a device type.

In an implementation process, each operation of the method may be completed by an integrated logic circuit of hardware in the processor 1130 or by an instruction in a software form. The operations of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 1140. The processor 1130 reads information in the memory 1140 and completes the operations of the method in combination with hardware. No more detailed descriptions will be made herein to avoid repetitions.

In a specific implementation mode, the determination module 910 of the network device in FIG. 9 may be implemented by the processor 1130 in FIG. 11, and the communication module 920 of the network device 800 may be implemented by the input interface 1110 and output interface 1120 in FIG. 11.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the application. The abovementioned storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

What is claimed is:

1. A communication method, implemented by a terminal device, comprising:
　　receiving information of a group of monitoring resources from a network device;
　　determining a target monitoring resource configured to monitor downlink control information from the group of monitoring resources based on demands for opportunities for monitoring the downlink control information; and
　　monitoring the downlink control information on the target monitoring resource;
　　wherein the target monitoring resource comprises periodic time-domain resources and further comprises frequency-domain resources, periods of the periodic time-domain resources are monitoring periods, each of the monitoring periods comprises monitoring positions for monitoring the downlink control information, and each of the monitoring positions corresponds to a specific frequency-domain width or a whole system bandwidth, the periodic time-domain resources in the target monitoring resource are of a subframe granularity or a symbol granularity,
　　wherein determining the target monitoring resource from the group of monitoring resources based on demands for opportunities for monitoring the downlink control information comprises:
　　　　regulating a period and/or a monitoring position of a monitoring resource in the group of monitoring resources based on demands for opportunities for monitoring the downlink control information; and
　　　　determining the regulated monitoring resource as the target monitoring resource,
　　wherein the group of monitoring resources corresponds to a first basic parameter set, determining the target monitoring resource from the group of monitoring resources based on demands for opportunities for monitoring the downlink control information comprises:
- in response to that a second basic parameter set configured for the terminal device is the same as the first basic parameter set, determining the target monitoring resource in the group of monitoring resources; or
- in response to that the second basic parameter set configured for the terminal device is different from the first basic parameter set, determining another group of monitoring resources based on the group of monitoring resources and determining the target monitoring resource in the another group of monitoring resources.

2. The method of claim 1, wherein the target monitoring resource comprises a periodic monitoring position.

3. The method of claim 1, further comprising:
receiving, by the terminal device, indication information of the network device, the indication information being used to indicate a monitoring resource configured by the network device for the terminal device to monitor the downlink control information.

4. The method of claim 3, wherein
determining, by the terminal device, the target monitoring resource configured to monitor the downlink control information comprises:
- determining, by the terminal device, a monitoring resource indicated by the indication information as the target monitoring resource; and
monitoring the downlink control information on the target monitoring resource comprises:
- monitoring the downlink control information on the monitoring resource indicated by the indication information.

5. The method of claim 4, wherein monitoring the downlink control information on the target monitoring resource comprises:
monitoring the downlink control information on the regulated monitoring resource.

6. The method of claim 1, further comprising:
receiving, by the terminal device, high-layer signaling of the network device, the high-layer signaling being used to configure a specific period for the terminal device.

7. The method of claim 6, wherein the high-layer signaling is Radio Resource Control (RRC) signaling.

8. A terminal device, comprising:
a memory for storing a program, an instruction or a code;
a processor;
an input interface; and
an output interface;
wherein the processor, the memory, the input interface and the output interface are communicated with each other, and the processor is configured to:
determine a target monitoring resource configured to monitor downlink control information; and
monitor the downlink control information on the target monitoring resource,
wherein the input interface is further configured to receive information of a group of monitoring resources from a network device; and
the processor is configured to determine the target monitoring resource from the group of monitoring resources based on demands for opportunities for monitoring the downlink control information,
wherein the target monitoring resource comprises periodic time-domain resources and further comprises frequency-domain resources, periods of the periodic time-domain resources are monitoring periods, each of the monitoring periods comprises monitoring positions for monitoring the downlink control information, and each of the monitoring positions corresponds to a specific frequency-domain width or a whole system bandwidth, the periodic time-domain resources in the target monitoring resource are of a subframe granularity or a symbol granularity,
wherein the processor is further configured to regulate a period and/or a monitoring position of a monitoring resource in the group of monitoring resources based on demands for opportunities for monitoring the downlink control information and determine the regulated monitoring resource as the target monitoring resource,
wherein the group of monitoring resources correspond to a first basic parameter set, the processor is configured to:
- in response to that a second basic parameter set configured for the terminal device is the same as the first basic parameter set, determine the target monitoring resource in the group of monitoring resources; or
- in response to that the second basic parameter set configured for the terminal device is different from the first basic parameter set, determine another group of monitoring resources based on the group of monitoring resources and determine the target monitoring resource in the another group of monitoring resources.

9. The terminal device of claim 8, wherein the input interface is further configured to:
receive indication information of the network device, the indication information being used to indicate a monitoring resource configured by the network device for the terminal device to monitor the downlink control information.

10. The terminal device of claim 9, wherein the processor is further configured to:
determine a monitoring resource indicated by the indication information as the target monitoring resource; and
control the input interface and the output interface to monitor the downlink control information on the monitoring resource indicated by the indication information.

11. The terminal device of claim 10, wherein the processor is further configured to:
control the input interface and the output interface to monitor the downlink control information on the regulated monitoring resource.

12. The terminal device of claim 9, wherein the input interface is further configured to:
receive the downlink control information from the network device, the downlink control information comprising the indication information.

13. The terminal device of claim 8, wherein the target monitoring resource does not comprise a time-domain position configured for the network device to transmit a downlink synchronization signal or a downlink reference signal.

14. The terminal device of claim 8, wherein the target monitoring resource comprises a periodic monitoring position, the target monitoring resource further comprises a frequency-domain resource for each monitoring position, and the frequency-domain resource is a specific frequency-domain width or a whole system bandwidth.

15. The terminal device of claim 8, wherein the input interface is further configured to:
   receive configuration information from a network device, the configuration information being used to configure a monitoring resource for the terminal device to initially monitor the downlink control information.

16. The terminal device of claim 15, wherein the monitoring resource for the terminal device to initially monitor the downlink control information is determined by the network device according to at least one of:
   a service feature of the terminal device and a basic parameter set configured for the terminal device.

* * * * *